R. MARTIN.
LOADING AND DUMPING LEVER FOR SCRAPERS.
APPLICATION FILED APR. 16, 1921.
1,411,176.
Patented Mar. 28, 1922.
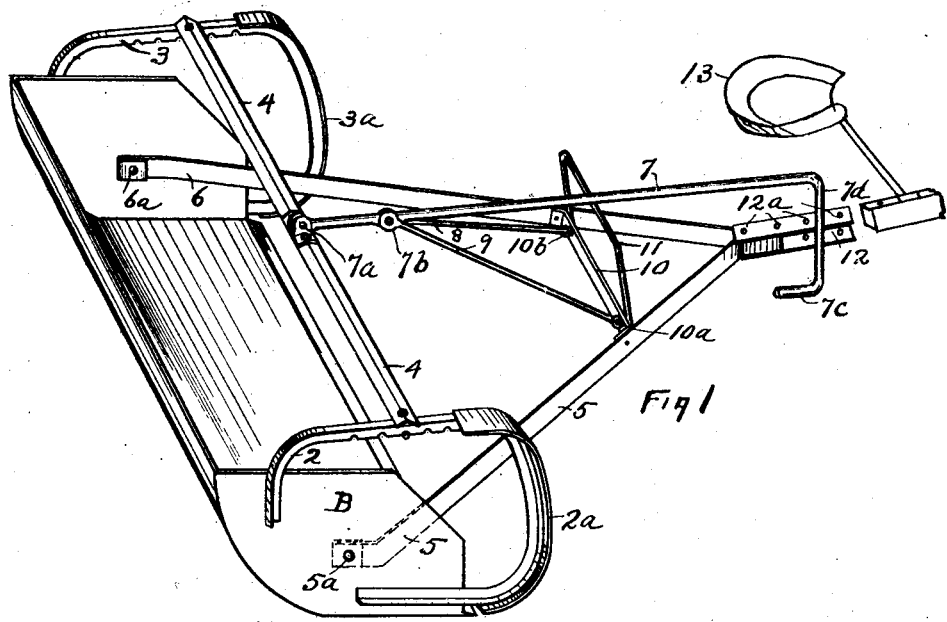
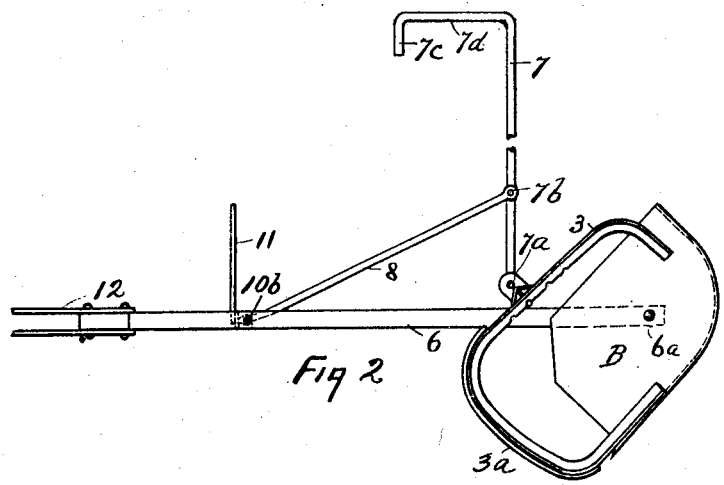
Ralph Martin,
by Francis C. Huebner
ATTORNEY.

UNITED STATES PATENT OFFICE.

RALPH MARTIN, OF SANGER, CALIFORNIA.

LOADING AND DUMPING LEVER FOR SCRAPERS.

1,411,176.  Specification of Letters Patent.  Patented Mar. 28, 1922.

Application filed April 16, 1921. Serial No. 461,746.

*To all whom it may concern:*

Be it known that I, RALPH MARTIN, a citizen of the United States, and resident of Sanger, in the county of Fresno and the State of California, have invented a new and useful Improvement in Loading and Dumping Levers for Scrapers, of which the following is a specification.

My invention relates to a device for dumping a drag dirt scraper. At the present time tractors are very much in use for operating a dirt scraper and it is necessary for the convenience of the operator to have means for loading and dumping the scraper which can be operated from the seat of a tractor. The object of my invention is to provide a new arrangement of levers for dumping the scraper whereby it can be manipulated at the front of the scraper, and which will operate to make the scraper load and dump easily. Another object is an arrangement of the levers whereby the scraper can be held in a position for dragging the dirt being dumped for the purpose of levelling it. Other objects will be hereinafter disclosed.

I accomplish these objects by means of the device described in the following specifications and illustrated on the accompanying drawing in which Figure 1 shows a perspective view of the scraper with the dumping levers complete. Figure 2 is a side view of the scraper held in a position for spilling and levelling the dirt. In said drawing B represents an ordinary scraper bowl of the kind commonly known as the Fresno scraper which is described and shown in a patent issued to D. W. Smith and J. K. Hopkins, October 13, 1891, No. 461,174, having two ends $B^1$ and $B^2$. In said drawing 2 and 3 are curved runners attached to each end of the scraper bowl. 4 is a cross bar connecting the runners on the upper side thereof. $2^a$ and $3^a$ are shoes on the runners. 5 and 6 are drag bars which are pivoted at one end to each of the ends $B^1$ and $B^2$ of the scraper bowl, and at the approximate center thereof with pivots $5^a$ and $6^a$. The other ends of the cross bars are joined at the front to a coupling 12. The hitch of the tractor, or other means for drawing the scraper can be attached to said coupling 12, which has a plurality of holes $12^a$ therein to adjust it to different forms of hitches. 10 is a cross support connecting drag bars 5 and 6 near the front end thereof. 7 is an operating handle for dumping the scraper. It is pivoted at one end to the approximate center of cross bar 4 with a pivot designated on the drawing as $7^a$. 8 and 9 are toggle braces which are pivoted with the common pivot $7^b$ to the operating handle 7, a short distance from the pivot $7^a$, the other ends of said toggle braces being pivoted to the cross support 10 near each end thereof with pivots $10^a$ and $10^b$. It will be noted that the toggle braces 8 and 9 form a V, the apex being at the pivot $7^b$, and the pivots $7^a$, $7^b$, $10^a$ and $10^b$ permit the operating handle 7 to be raised and lowered. 11 is a rest which extends upward from the cross support 10, the object being to limit the downward movement of operating handle 7. It will be noted that by raising the operating lever 7 the distance between the pivot $7^a$ and the cross support 10 will be shortened, and the bowl of the scraper will turn upon pivots $5^a$ and $6^a$ to a position for dumping the bowl, and when the operating handle 7 is lowered the distance between the pivot $7^a$ and the cross support 10 is increased, thus moving the bowl back to a loading position. For the purpose of bringing the handle nearer to the seat of the tractor as it is moved upward I have bent the rod forming the operating handle near the end opposite the pivot $7^a$ at approximately right angles downward, designated as $7^d$, and nearer the end is a second bend at right angles to the portion $7^d$ designated as $7^e$. It is proposed to have the operating handle 7 long enough so that it extends to a position adjacent to the seat of the tractor so a person sitting on the tractor seat can readily reach down and manipulate the levers. 13 represents the seat of a tractor showing its approximate relation to the scraper when the scraper is hitched to the tractor. It will be noted that this attachment can by a slight modification be placed on other forms of scrapers and can be cheaply constructed.

Having described my invention I claim:

1. In combination with a drag scraper having a bowl and drag bars, one of which is pivoted at one end to each end of the scraper bowl and which drag bars converge and are joined at the other ends, a cross support joining the ends of the scraper bowl, an operating lever pivoted at the approximate center of the cross support and extending forward, and toggle braces each of which is pivoted at one end to the operating lever with a common pivot and pivoted at the other end to the drag bars in such relation that a toggle joint is formed at the said common pivot, substantially as described.

2. In combination with a scraper having a bowl to which drag bars are pivoted, a cross support connecting the ends of the scraper bowl, an operating lever pivoted thereto, toggle braces pivoted to the operating lever at one end and to a cross brace attached to the drag bars at the other, the assembled levers being adapted by a movement of the operating lever upward and downward to turn the bowl on the pivots attaching the drag bars to the scraper bowl, substantially as described.

3. In a device of the character described, a scraper bowl having ends therein a runner on each of said ends and a cross bar connecting the tops of said runners of an operating lever pivoted at one end to said cross bar, and drag bars pivoted at one end to the ends of the scrapers, a toggle lever pivoted to the operating lever between the ends thereof, and at the other end to the drag bars, said pivots permitting the operating handle to be raised and lowered, and means for limiting the downward movement of the operating lever, all substantially as described.

RALPH MARTIN.